(12) United States Patent
Hung

(10) Patent No.: US 10,052,805 B2
(45) Date of Patent: Aug. 21, 2018

(54) TWO-STAGE HYDRAULIC BOOSTER DEVICE FOR A MOLD FUNCTIONAL COMPONENT

(71) Applicants: HYDR-AUTO (YT) CO., LTD., Shandong Yantai (TW); Shao-Yang Hung, Taoyuan County (TW)

(72) Inventor: Shao-Yang Hung, Taoyuan County (TW)

(73) Assignee: HYDR-AUTO (YT) CO., LTD., Yantai (CN)

( * ) Notice: Subject to any disclaimer, the term of this patent is extended or adjusted under 35 U.S.C. 154(b) by 229 days.

(21) Appl. No.: 15/110,047

(22) PCT Filed: Mar. 10, 2015

(86) PCT No.: PCT/IB2015/000903
§ 371 (c)(1),
(2) Date: Jul. 6, 2016

(87) PCT Pub. No.: WO2015/136371
PCT Pub. Date: Sep. 17, 2015

(65) Prior Publication Data
US 2016/0354962 A1 Dec. 8, 2016

(30) Foreign Application Priority Data
Mar. 11, 2014 (TW) .............................. 103204081 U

(51) Int. Cl.
*B29C 45/82* (2006.01)
*B29C 45/28* (2006.01)
(Continued)

(52) U.S. Cl.
CPC ............ *B29C 45/82* (2013.01); *B29C 45/281* (2013.01); *F15B 1/027* (2013.01); *F15B 7/08* (2013.01); *B29C 45/38* (2013.01); *B29C 45/5675* (2013.01)

(58) Field of Classification Search
CPC ..... B29C 45/82; B29C 45/5675; B29C 45/38; F15B 7/08
See application file for complete search history.

(56) References Cited

U.S. PATENT DOCUMENTS 4,690,629 A * 9/1987 Horikawa ............... B29C 45/82
425/156
5,560,419 A * 10/1996 Yoshida et al. ........ B22D 17/12
164/4.1
(Continued)

*Primary Examiner* — Thomas E Lazo
(74) *Attorney, Agent, or Firm* — Wayne & King LLC

(57) ABSTRACT

A two-stages hydraulic booster device for mold functional components includes a first hydraulic control one-way valve serially connected between the solenoid directional control valve and the pumping chamber of the supercharger via a first oil passage; a second hydraulic control one-way valve serially connected between the solenoid directional control valve and the pressure accumulating chamber of the supercharger via a second oil passage. The solenoid directional control valve simultaneously supplying oil to the first and second hydraulic control one-way valves via the first and second oil passages, respectively, and the pressure for opening the second hydraulic control one-way valve is larger than that of the first hydraulic control one-way valve, thereby moving the back pressure formed in the first oil passage to open the second hydraulic control one-way valve to drive the piston to transform the low pressure oil into high pressure oil to move the mold functional components.

5 Claims, 1 Drawing Sheet

(51) Int. Cl.
   *F15B 1/027*   (2006.01)
   *F15B 7/08*    (2006.01)
   *B29C 45/38*   (2006.01)
   *B29C 45/56*   (2006.01)

(56) References Cited

U.S. PATENT DOCUMENTS

| | | | | |
|---|---|---|---|---|
| 6,013,211 A * | 1/2000 | Seki | ................ | B29C 45/76 |
| | | | | 425/149 |
| 7,806,162 B2 * | 10/2010 | Kotagiri et al. | ....... | B22D 27/09 |
| | | | | 164/112 |
| 2011/0247777 A1 * | 10/2011 | Hauser | ................ | B22D 17/00 |
| | | | | 164/303 |

* cited by examiner

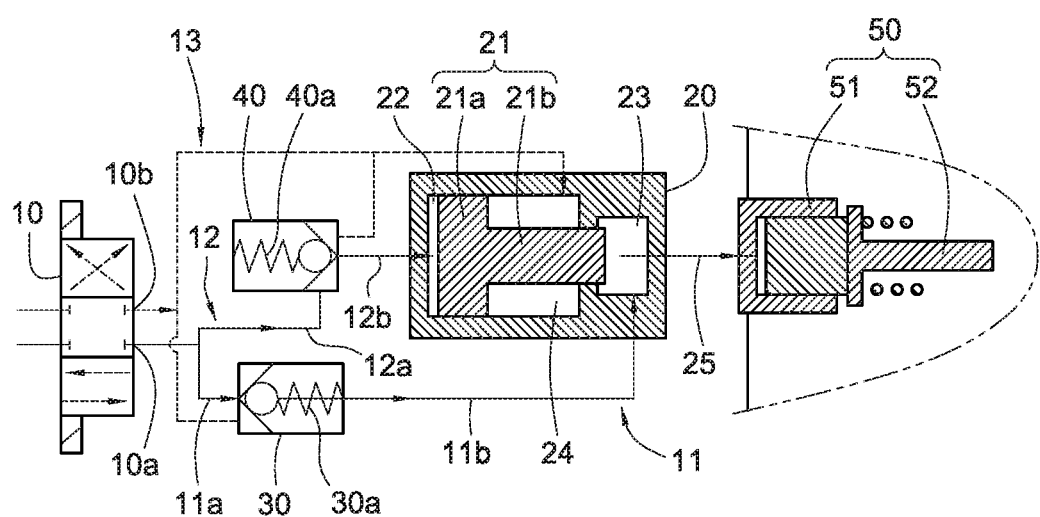

TWO-STAGE HYDRAULIC BOOSTER DEVICE FOR A MOLD FUNCTIONAL COMPONENT

BACKGROUND

1. Technical Field

The technical field relates to a hydraulic valve arrangement technique of a mold functional component, particularly to a two-stage hydraulic booster device for mold functional components.

2. Related Art

In order to do the auto cutting or pushing and squeezing plastic pieces, the inside of the traditional male mold and female mold used for forming the plastic are usually installed functional components, such as a movable core or a high pressure cylinder. When the melted plastic has injected into the mold and not yet solidified, those functional components can be used as a valve of the plastic flowing channel, or a valve of the gas vent of the mold, or remnant after cutting the plastic pieces, or to punch the predetermined holes or troughs on the plastic pieces, or to do the cutting, pressing and filling processes to the plastic pieces. Thus, after the plastic injected into the mold is solidified, the surface of the plastic can be kept smooth and saving the process of removing the pouring opening or the burr of the plastic.

The mold closing and opening of the male and female mold, and the movable core moving back and forth inside the mold, both rely on hydraulic equipment to provide strong driving force. Wherein, the mold opening and closing movement need approximate 120 kg/cm$^2$ to 150 kg/cm$^2$ low pressure oil power provided by the hydraulic equipment. The movable core even needs 600 kg/cm$^2$ to 1500 kg/cm$^2$ ultrahigh pressure oil power provided by the booster installed inside the hydraulic equipment to make sure the movable core functioning well during the processing.

Besides, the conventional hydraulic equipment attached to the plastic molding machine uses a continuously boosting method to increase the oil pressure to high pressure or ultrahigh pressure. However, a special high pressure or ultrahigh pressure valve needs to be installed in the whole oil passage. This special valve costs a lot and is big in volume.

In order to improve the inconvenience of using the high pressure or ultrahigh pressure valve, an intermittent pressure boosting of the hydraulic equipment is applied. However, the intermittent pressure boosting can only provide limited amount of oil to increase the oil pressure during each pressure boosting section. When varieties of mold functional components are linked to the hydraulic equipment, the oil supply for pressure boosting can be insufficient, which may hard to fulfill the ultrahigh pressure requirement of driving the mold functional components.

BRIEF SUMMARY

One of the exemplary embodiments of the present invention uses two stages pressure boost technique to solve the problem that the fixed amount of pressure boosting oil supplied by the intermittent pressure booster cannot fulfill the ultrahigh pressure requirement for driving varieties of mold functional components One of the exemplary embodiments of the present invention provides a two-stages hydraulic booster device for a mold functional component, which includes: a supercharger including a pressure accumulating chamber and a pumping chamber used for containing oil; a piston is provided between the pressure accumulating chamber and the pumping chamber; a pushing area of the pressure accumulating chamber propelling the piston is greater than that of the pumping chamber; an oil supply of the pressure accumulating chamber is controlled by a solenoid directional control valve; the pumping chamber is supplied with oil by an ultrahigh pressure oil tube to drive and move at least one set of mold functional components. The two-stages hydraulic booster device for a mold functional component featuring on that: a first hydraulic control one-way valve is serially connected between the solenoid directional control valve and the pumping chamber via a first oil passage; a second hydraulic control one-way valve is serially connected between the solenoid directional control valve and the pressure accumulating chamber via a second oil passage; the solenoid directional control valve simultaneously supplies oil to the first hydraulic control one-way valve and the second hydraulic control one-way valve via the first oil passage and the second oil passage, respectively, and a pressure for opening the second hydraulic control one-way valve is larger than that of the first hydraulic control one-way valve.

In a further embodiment, when the solenoid directional control valve simultaneously supplies oil to the first and the second hydraulic control one-way valve, the first hydraulic control one-way valve is driven to be open to accumulate oil in the pumping chamber, and a back pressure will be formed after the first oil passage is fully filled by the oil, thereby completing a first stage low pressure oil supply.

In a further embodiment, right after the first stage low pressure oil supply is completed, the back pressure will be formed in the second oil passage to drive and keep opening the second hydraulic control one-way valve to accumulate the oil in the pressure accumulating chamber to increase an oil pressure therein.

In a further embodiment, the oil pressure in the pressure accumulating chamber drives the piston to push the first stage low pressure oil in the pumping chamber, and the first hydraulic control one-way valve prevent the first stage low pressure oil from flowing backward, thereby forming a second stage high pressure oil.

In a further embodiment, the supercharger further has a return oil chamber, the piston is slidably assembled in the return oil chamber between the pressure accumulating chamber and the pumping chamber, a third oil passage links the return oil chamber, the solenoid directional control valve, the first hydraulic control one-way valve, and the second hydraulic control one-way valve, the solenoid directional control valve controls the oil supply of the third oil passage to drive the first and the second hydraulic control one-way valve to open to reduce pressure of the pressure accumulating chamber and the pumping chamber, and the third oil passage also supplies oil to force the piston in the return oil chamber back to an original position.

According to the above mentioned features, the technique of the preferred embodiment of the present invention lies in that: providing low pressure oil in the first stage to supply the oil in the ultrahigh oil tube to drive the mold functional components, and using the pressure differences between the first and the second hydraulic control one-way valves to propel the piston to do the second pressure boost, which can solve the problem that the conventional intermittent pressure boost provides insufficient amount of oil. The preferred embodiment of the present invention also utilizes the pressure differences between the first and the second hydraulic control one-way valves to open the second hydraulic control one-way valve by the back pressure which is formed after sufficient amount of the first stage low pressure oil is provided, and the first stage low pressure oil can be transformed to the second stage high pressure oil to fulfill the ultrahigh pressure requirement for the varieties of mold functional components.

The detailed features of the preferred embodiments and figures of the present invention will be described as follows.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a schematic diagram of the two-stage hydraulic booster device for mold functional components of a preferred embodiment of the present invention.

DETAILED DESCRIPTION

Referring to FIG. 1, a preferred embodiment of the two-stages hydraulic booster device for a mold functional component of present invention includes using a solenoid directional control valve 10 to control the oil supply. The solenoid directional control valve 10 can be an existing device or an individually installed device in the hydraulic equipment of the plastic forming machine. In other words, the solenoid directional control valve 10 can also be deem as an oil supply valve in the hydraulic equipment of the plastic forming machine, and the solenoid directional control valve 10 has at least one first oil supply port 10a where the oil supply can be controlled by a programmable controller which originally equipped or is attached to the plastic forming machine.

FIG. 1 also discloses that the two-stage hydraulic booster device for a mold functional component is further equipped with a supercharger 20, which is used as a component to boost the pressure to drive at least one set of mold functional components 50. The supercharger 20 is substantially a hydraulic thruster equipped with a piston 21. The supercharger 20 has a pressure accumulating chamber 22 and a pumping chamber 23 which can accommodate oil. The pressure accumulating chamber 22 can control the supply of the low pressure oil by the solenoid directional control valve 10. The pumping chamber 23 is linked to the mold functional components 50 via an ultrahigh pressure oil tube 25 which provides ultrahigh pressure oil to drive the mold functional components 50. The piston 21 is slidably assembled between the pressure accumulating chamber 22 and the pumping chamber 23. More specifically, the piston 21 integrally forms a piston head 21a and a piston rod 21b. The diameter of the piston head 21a is larger than the diameter of the piston rod 21b. The piston head 21a is slidably assembled in the pressure accumulating chamber 22, and the piston rod 21b is slidably assembled in the pumping chamber 23. Therefore, the oil pushing area which moves the piston 21 in the pressure accumulating chamber 22 is larger than that of the pumping chamber 23.

A first hydraulic control one-way valve 30 is serially connected between the first oil supply port 10a of the solenoid directional control valve 10 and the pumping chamber 23 via a first oil passage 11. More specifically, the first oil passage 11 includes a first oil tube 11a and a second oil tube 11b. The first oil tube 11a is linked between the first oil supply port 10a of the solenoid directional control valve 10 and the first hydraulic control one-way valve 30; the second oil tube 11b is linked between the first hydraulic control one-way valve 30 and the pumping chamber 23 of the supercharger 20.

A second hydraulic control one-way valve 40 is serially connected between the first oil supply port 10a of the solenoid directional control valve 10 and the pressure accumulating chamber 22 via a second oil passage 12. More specifically, the second oil passage 12 includes a third oil tube 12a and a fourth oil tube 12b. The third oil tube 12a is linked between the first oil supply port 10a of the solenoid directional control valve 10 and the second hydraulic control one-way valve 40; the fourth oil tube 12b is linked between the second hydraulic control one-way valve 40 and the pressure accumulating chamber 22 of the supercharger 20. In practice, the first oil tube 11a and the third oil tube 12a can be linked in parallel to the first oil supply port 10a of the solenoid directional control valve 10 so that the solenoid directional control valve 10 can control the simultaneous oil supply to the first oil tube 11a and the third oil tube 12a, thereby simultaneously supplying low pressure oil to the first hydraulic control one-way valve 30 and the second hydraulic control one-way valve 40 via the first oil passage 11 and the second oil passage 12.

The aforementioned first hydraulic control one-way valve 30 and the second hydraulic control one-way valve 40 are mechanical normally closed valves. A first spring 30a which normally presses and closes the valve body is provided in the first hydraulic control one-way valve 30. A second spring 40a which normally presses and closes the valve body is provided in the second hydraulic control one-way valve 40. The elastic force of the second spring 40a is larger than that of the first spring 30a. Therefore, the oil pressure which opens the second hydraulic control one-way valve 40 should be always larger than the oil pressure opening the first hydraulic control one-way valve 30.

According to the aforementioned configuration, when the solenoid directional control valve 10 is opened, the solenoid directional control valve 10 can simultaneously provide 120 kg/cm$^2$ to 150 kg/cm$^2$ low pressure oil to the first hydraulic control one-way valve 30 and the second hydraulic control one-way valve 40 via the first oil tube 11a and the third oil tube 12a, respectively. Since the elastic force of the second spring 40a is larger than the elastic force of the first spring 30a, the low pressure oil can firstly overcome the elastic force of the first spring 30a of the first hydraulic control one-way valve 30 to keep the first hydraulic control one-way valve 30 open, and provide approximate 150 kg/cm$^2$ low pressure oil via the second oil tube 11b to the pumping chamber 23 to accumulate therein. When the low pressure oil is fully filled the pumping chamber 23, a back pressure will be formed along the first oil passage 11 (including the first oil tube 11a and the second oil tube 11b), so as to complete the first stage low pressure oil supply.

After the first stage low pressure oil supply is completed, the back pressure will simultaneously apply to the second oil passage 12, which includes simultaneously filling the third oil tube 12a with low pressure oil, and the back pressure can overcome the elastic force of the second spring 40a to keep the second hydraulic control one-way valve 40 open right after the first hydraulic control one-way valve 30, so as to provide approximate 150 kg/cm$^2$ oil to the pressure accumulating chamber 22 to accumulate therein. Since the oil pushing area in the pressure accumulating chamber 22 to push the piston 21 is larger than that of the pumping chamber 23, and the diameter of the piston head 21a is also larger than that of the piston rod 21b, the piston head 21a in the pressure accumulating chamber 22 cab be propelled by the approximate 150 kg/cm² oil to move from the pressure accumulating chamber 22 toward the pumping chamber 23, thereby forcing the piston rod 21b pressing the first stage low pressure oil in the pumping chamber 23. Meanwhile, the first hydraulic control one-way valve 30 can prevent the low pressure oil from flowing backward, which makes the first stage low pressure oil to be quickly pressed by the piston rod 21b to form approximate 600 kg/cm² to 1500 kg/cm² ultrahigh pressure second stage oil. The second stage ultrahigh pressure oil can be transferred via the ultrahigh pressure oil tube 25 to drive the mold functional components 50 to move.

In the aforementioned embodiment, the oil pressure of the first stage oil and the second stage oil are just for demonstration, and the pressure value are not limited thereto.

The aforementioned mold functional components 50 further include a miniature oil cylinder 51 and a movable core 52. More specifically, the second stage oil is transferred via the ultrahigh pressure oil tube 25 to drive the miniature oil cylinder 51, and the specific function and movement can be executed by the movable core 52 powered by the miniature oil cylinder 51. Those specific function and movement can be the valve closing movement of the poring opening of the plastic flowing channel in the mold, or the valve closing movement of the vent in the mold, or the cutting movement for removing the redundant material of the plastic product, or the hole or trough punching movement on the plastic product, or the cutting, squeezing and filling plastic movement to the plastic product.

Besides, the aforementioned supercharger 20 further has a return oil chamber 24; the piston 21 is slidably assembled in the return oil chamber 24 between the pressure accumulating chamber 22 and the pumping chamber 23. More specifically, the pressure accumulating chamber 22 is spaced apart from the return oil chamber 24 by the piston head 21a of the piston 21, and the return oil chamber 24 is spaced apart from the pumping chamber by the piston rod 21b. The technique used to achieve the "space apart" purpose includes sleeving oil ring on the piston head, the piston rod, or the inner surface of the chamber to prevent leaking. Moreover, the solenoid directional control valve 10 also has a second oil supply port 10b, which allows the solenoid directional control valve 10 being able to control the oil supply form either one of the first oil supply port 10a and the second oil supply port 10b. In other words, when the first oil supply port 10a is open to supply oil, the second oil supply port 10b can be used as a pressure releasing terminal, and vice versa. As such, a third oil passage 13 can link the return oil chamber 24, the second oil supply port 10b of the solenoid directional control valve 10, the first hydraulic control one-way valve 30, and the second hydraulic control one-way valve 40. The third oil passage 13 is substantially an oil tube with four openings, or a single oil tube links to three other oil tubes in parallel. By this arrangement, the four openings can respectively link to the return oil chamber 24, the second oil supply port 10b of the solenoid directional control valve 10, the first hydraulic control one-way valve 30, and the second hydraulic control one-way valve 40. Therefore, the solenoid directional control valve 10 can be used to do the controlling as follows:

When the first oil passage 11 and the second oil passage 12 supply oil to drive the mold functional components 50 to move, the solenoid directional control valve 10 control the second oil supply port 10b to supply oil and make the first oil supply port 10a become the pressure releasing terminal. As such, the first hydraulic control one-way valve 30, the second hydraulic control one-way valve 40, and the piston 21 serially connected to the first oil passage 11 can release the pressure, and the third oil passage 13 can supply oil to force the piston 21 in the return oil chamber 24 back to the original position. Meanwhile, the miniature oil cylinder 51 and the movable core 52 of the mold functional components 50 no longer being pushed by the ultrahigh pressure oil, and a spring installed in the miniature oil cylinder 51 and the movable core 52 can push the miniature oil cylinder 51 and the movable core 52 back to the original position, thereby being able to repeat those processes described above.

According to the detailed description above, the two-stages pressure boosting means according to the preferred embodiment of the present invention not only is able to solve the problem that very limited amount of pressure boosting oil can be supplied by the intermittent pressure booster, but is also able to fulfill the ultrahigh pressure requirement for driving varieties of mold functional components.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A two-stages hydraulic booster device for a mold functional component, comprising:
a supercharger including a pressure accumulating chamber and a pumping chamber used for containing oil, a piston being provided between the pressure accumulating chamber and the pumping chamber, a pushing area of the pressure accumulating chamber propelling the piston being greater than that of the pumping chamber, an oil supply of the pressure accumulating chamber being controlled by a solenoid directional control valve, the pumping chamber being supplied with oil by an ultrahigh pressure oil tube to drive and move at least one set of mold functional components, the two-stages hydraulic booster device for a mold functional component featuring on that:
a first hydraulic control one-way valve serially connected between the solenoid directional control valve and the pumping chamber via a first oil passage, a second hydraulic control one-way valve serially connected between the solenoid directional control valve and the pressure accumulating chamber via a second oil passage, the solenoid directional control valve simultaneously supplying oil to the first hydraulic control one-way valve and the second hydraulic control one-way valve via the first oil passage and the second oil passage, respectively, and a pressure for opening the second hydraulic control one-way valve being larger than that of the first hydraulic control one-way valve.

2. The two-stages hydraulic booster device according to claim 1, wherein when the solenoid directional control valve simultaneously supplies oil to the first and the second hydraulic control one-way valve, the first hydraulic control one-way valve is driven to be open to accumulate oil in the pumping chamber, and a back pressure will be formed after the first oil passage is fully filled by the oil, thereby completing a first stage low pressure oil supply.

3. The two-stages hydraulic booster device according to claim 2, wherein right after the first stage low pressure oil supply is completed, the back pressure will be formed in the second oil passage to drive and keep opening the second hydraulic control one-way valve to accumulate the oil in the pressure accumulating chamber to increase an oil pressure therein.

4. The two-stages hydraulic booster device according to claim 3, wherein the oil pressure in the pressure accumulating chamber drives the piston to push the first stage low pressure oil in the pumping chamber, and the first hydraulic control one-way valve prevent the first stage low pressure oil from flowing backward, thereby forming a second stage high pressure oil.

5. The two-stages hydraulic booster device according to claim 1, wherein the supercharger further has a return oil chamber, the piston is slidably assembled in the return oil chamber between the pressure accumulating chamber and the pumping chamber, a third oil passage links the return oil chamber, the solenoid directional control valve, the first hydraulic control one-way valve, and the second hydraulic control one-way valve, the solenoid directional control valve controls the oil supply of the third oil passage to drive the first and the second hydraulic control one-way valve to open to reduce pressure of the pressure accumulating chamber and the pumping chamber, and the third oil passage also supplies oil to force the piston in the return oil chamber back to an original position.

\* \* \* \* \*